United States Patent [19]

Ibaraki

[11] Patent Number: 4,614,982
[45] Date of Patent: Sep. 30, 1986

[54] PICTURE GENERATING APPARATUS FOR A ROTARY RECORDING MEDIUM REPRODUCING APPARATUS

[75] Inventor: Hirozi Ibaraki, Saitama, Japan

[73] Assignee: Victor Company of Japan, Ltd., Yokohama, Japan

[21] Appl. No.: 599,175

[22] Filed: Apr. 11, 1984

[30] Foreign Application Priority Data

Apr. 19, 1983 [JP] Japan .............................. 58-68894

[51] Int. Cl.⁴ ............................................ H04N 5/76
[52] U.S. Cl. .................................... 358/342; 358/335
[58] Field of Search .............. 358/310, 312, 313, 320, 358/322, 327, 11, 342, 335, 140

[56] References Cited

U.S. PATENT DOCUMENTS

| 4,148,077 | 4/1979 | Bragas . | |
|---|---|---|---|
| 4,283,736 | 8/1981 | Morio et al. | 358/313 |
| 4,447,834 | 5/1984 | Sugiyama | 358/310 |

FOREIGN PATENT DOCUMENTS

| 0044385 | 5/1981 | European Pat. Off. . | |
|---|---|---|---|
| 57-48886 | 3/1982 | Japan | 358/310 |
| 1425273 | 2/1976 | United Kingdom | 358/327 |
| 2064260 | 6/1981 | United Kingdom . | |

*Primary Examiner*—Donald McElheny, Jr.

[57] ABSTRACT

A picture generating apparatus for a disc reproducing apparatus, comprises a circuit for storing at least one picture information data, different from the picture information data of the recorded video signal, from among various additional information, a counter for producing a coincidence signal when a counted value of horizontal synchronizing pulses coincides with a preset value, a data obtaining circuit for successively obtaining the stored picture information data for a predetermined number of scanning lines from a time when the coincidence signal is produced, a circuit for selectively producing a picture signal having a predetermined constant level in a duration in which the picture information data is obtained and the reproduced video signal in a duration in which the picture information data is not obtained, and a circuit for carrying out a control so that the coincidence signal is produced at a point when a number of horizontal synchronizing pulses in the range of 25 have been reproduced more than a value of the preset value at the time of playing a disc recorded with the video signal of a first system employing 525 scanning lines, when playing a disc recorded with a video signal of a second system employing 625 scanning lines so that the horizontal scanning frequency is reproduced with the horizontal scanning frequency of the first system.

7 Claims, 8 Drawing Figures

PICTURE GENERATING APPARATUS FOR A ROTARY RECORDING MEDIUM REPRODUCING APPARATUS

BACKGROUND OF THE INVENTION

The present invention generally relates to picture generating apparatuses for rotary recording medium reproducing apparatuses, and more particularly to a picture generating apparatus for a rotary recording apparatus which controls the rotational speed of a rotary recording medium (hereinafter simply referred to as a disc) which is being played, so that a horizontal scanning frequency of a video signal which is recorded on the disc is reproduced at a horizontal scanning frequency of a predetermined system which is determined by a monitoring apparatus which displays a reproduced picture. The picture generating apparatus according to the present invention generates a picture related to an address information which indicates the position of a recorded track on the disc, for example, and displays the generated picture in a part of the reproduced picture which is displayed on the monitoring apparatus.

A video disc which is recorded with a color video signal as variations in geometrical configuration, is known. In such a video disc, the color video signal is converted into a predetermined signal format together with an audio signal, before being recorded as the variations in the geometrical configuration. The color video signal is converted into the predetermined signal format which is different from a standard television system, before being recorded on the video disc. However, the field frequency and the horizontal scanning frequency (in other words, the number of scanning lines), are the same as the field frequency and the horizontal scanning frequency of the standard television system. Since there are two popular television systems which are presently being employed in most parts of the world, one being a first system having a field frequency of 60 Hz (59.94 Hz in the case of a color video signal) and 525 scanning lines and the other being a second system having a field frequency of 50 Hz and 625 scanning lines, it is necessary to prepare at least two systems for recording the video disc.

A reproducing apparatus was proposed in a U.S. Pat. No. 4,445,143 of which the assignee is the same as the assignee of the present application. According to this proposed reproducing apparatus, the video disc is played while the rotational speed of the video disc is controlled so that a horizontal synchronizing signal of the recorded video signal is reproduced with a predetermined frequency which is in conformance with a television system with which the reproduction is to be carried out. Thus, video discs which are recorded with color video signals of different television systems, may be played compatibly according to this proposed reproducing apparatus.

As is well known, the color television system is not unified throughout the world. There are two main differences among the different color television systems, the first main difference being the number of scanning lines and the field frequency, and the second main difference being the transmission format of the chrominance signal. The color television systems are divided into three types, that is, the NTSC system, the PAL system, and the SECAM system, according to the transmission format of the chrominance signal. However, the chrominance signal which is transmitted, is made up of two kinds of color difference signals as is well known. Because the video disc reproducing apparatus is intended to only play the video disc and reproduce the recorded color video signal, the chrominance signal which is recorded on the video disc need not have a signal format which is in conformance with one of the NTSC, PAL, and SECAM systems. In other words, the chrominance signal can be recorded on the video disc with a common signal format which is independent of the color television system with which the reproduction is to be carried out. In this case, the chrominance signal which is reproduced from the video disc can be converted into a signal which has been modulated with a predetermined modulation system which is in conformance with a desired standard television system among the NTSC, PAL, and SECAM systems, when supplying a reproduced color video signal to an external monitoring television receiver as a standard system color video signal from the video disc reproducing apparatus. Accordingly, with respect to the different transmission formats of the chrominance signals, it is possible to achieve compatibility by providing in the video disc reproducing apparatus a converter for obtaining a carrier chrominance signal which is in conformance with a predetermined standard television system.

On the other hand, concerning the first main difference described before, there basically are two systems at the present. The first system employs 525 scanning lines per frame and the field frequency is 60 Hz (59.94 Hz in the case of a color video signal). The second system employs 625 scanning lines per frame and the field frequency is 50 Hz. The difference between the horizontal scanning frequencies in the two systems is therefore only in the order of 0.7%. Further, the difference between the field frequencies in the two systems, is only to a degree that is adjustable in a commonly available television receiver. Thus, in the proposed reproducing apparatus described before, the rotational speed of the video disc was controlled so that the recorded horizontal synchronizing signal is reproduced from the video disc with a horizontal synchronizing signal which is in conformance with a color television system with which the reproduction was to be carried out in the monitoring television receiver. As a result, it was possible to compatibly play the video discs which have been recorded according to different color television systems, and obtain a reproduced picture which was both horizontally and vertically synchronized.

Accordingly, in a case where the color video signal which is recorded on the video disc at a rate of 4 fields per revolution of the video disc and is recorded for 60 minutes on one recording surface of the video disc, employs the first system described above, 54000 tracks are formed on one recording surface of the video disc when the number of tracks formed in one revolution of the video disc is one. Of course, the color video signal which is reproduced from this video disc can be displayed on the monitoring television receiver of the first system, by rotating the video disc at a rotational speed of 899.1 rpm. However, the color video signal which is reproduced from this video disc can also be displayed on the monitoring television receiver of the second system, by rotating the video disc at a rotational speed which is 0.7% slower than 899.1 rpm. In this case, the 60-minute program takes approximately 25 seconds longer to reproduce, however, the reproduced picture which is displayed on the monitoring television receiver of the second system is satisfactory from the practical point of view. Similarly, in a case where the color video signal which is recorded on the video disc employs the second system, 45000 tracks are formed on one recording surface of the video disc. When this color video signal is to be reproduced from the video disc and displayed on the monitoring television receiver of the first system, the video disc is rotated at a rotational speed which is 0.7% faster than the original rotational speed of 750 rpm. In this case, the 60-minute program will take approximately 25 seconds shorter to reproduce, but the reproduced picture which is displayed on the monitoring television receiver of the first system is satisfactory from the practical point of view. Thus, it is possible to satisfactorily display the color video signal of the second system which is reproduced from the video disc, on the monitoring television receiver of the first system.

Generally, various address signals are recorded on the video disc, for the purpose of random access and the like. For example, the address signals indicate the position of a recorded track in terms of a recording time from a lead-in position on the video disc, in terms of a sequence of recorded programs, and in terms of a number of recorded tracks from the lead-in position. The address signals are multiplexed and recorded in a predetermined duration within the vertical blanking period of the video signal. Conventionally, there was a video disc reproducing apparatus having a picture generating apparatus for generating a picture information which is to be displayed in a part of the reproduced picture. For example, the picture generating apparatus generated a picture information related to an address information which was being reproduced in order to constantly let the operator know the position of the pickup reproducing element, generated a picture information related to a target address information during a random access operation. The pickup reproducing element was a scanning stylus, or a detector which projected a light beam on the disc and detected the change in the light intensity of the reflected or transmitted light, for example.

The display of the picture information, which is generated from the picture generating apparatus, in a part of the reproduced picture, is referred to as a "on screen display". The "on screen display" was made in white, for example, at an upper right corner of the reproduced picture or at other corner parts of the reproduced picture so as not to greatly interfere with the original reproduced picture.

However, in the case where the monitoring television receiver made exclusively for the first system is to display the video signal which is reproduced from the disc which has been recorded with the video signal of the second system, by use of the proposed disc reproducing apparatus described before, the "on screen display" in the reproduced picture is made at a position which is higher than the position of the "on screen display" which is made when playing the video disc which has been recorded with the video signal of the first system, due to the different number of horizontal scanning lines employed in the two systems. In other words, the number of scanning lines employed in the second system is 625 which is 100 more than the number of scanning lines employed in the first system. Hence, when the video signal of the second system, in which the horizontal scanning frequency has been converted to 15.734 kHz, is displayed on the commonly available television receiver which is made exclusively for the first system and does not have a means for converting the vertical scanning frequency from 60 Hz to 50 Hz, the reproduced picture becomes stretched in the vertical direction thereof. This is because the display made in this case, may be considered equivalent to adding 50 horizontal scanning lines at both the upper and lower parts of the picture so as to display a picture having 625 scanning lines. On the other hand, in the conventional picture generating apparatus, the position of the "on screen display" was determined by a counted value in a counter which counted the horizontal synchronizing signals immediately after the trailing edge of a vertical synchronizing pulse. For this reason, compared to the case where the first system disc was played, the position of the "on screen display" moved to a position which is higher by 50 scanning lines, that is, by 25 counts in the counter if the interlacing was taken into account, when playing the second system disc and displaying the reproduced picture on the television receiver made exclusively for the first system. Consequently, a portion of or the full "on screen display" could not be made within the reproduced picture.

SUMMARY OF THE INVENTION

Accordingly, it is a general object of the present invention to provide a novel and useful picture generating apparatus for a rotary recording medium reproducing apparatus, in which the problems described heretofore have been eliminated.

Another and more specific object of the present invention is to provide a picture generating apparatus for a rotary recording medium reproducing apparatus, in which the rotational speed of a rotary recording medium is controlled so that a horizontal synchronizing pulse within a signal which is recorded on the rotary recording medium, is reproduced at a frequency which coincides with a horizontal scanning frequency of a first system which employs 525 scanning lines. Moreover, when playing a rotary recording medium which is recorded with a video signal of a second system, counter means for generating a coincidence signal when the horizontal synchronizing pulses are counted up to a preset value, is controlled so as to generate the coincidence signal when approximately 25 more horizontal synchronizing pulses have been counted from the preset value which is preset for the case where a rotary recording medium recorded with the video signal of the first system is played, for the purpose of determining a display position of a display data such as an address information in a vertical direction of the reproduced picture which is displayed on a monitoring reproducing apparatus.

According to the picture generating apparatus of the present invention, it is possible to generate the display data so that the display data is displayed at the same position in the reproduced picture, for the case where the rotary recording medium recorded with the video signal of the first system is played, and for the case where the rotary recording medium recorded with the video signal of the second system is played. In other words, an "on screen display" can be made at the same position in the reproduced picture, regardless of whether the rotary recording medium which is being played is recorded with the video signal of the first or second system.

Still another object of the present invention is to provide a picture generating apparatus for a rotary recording medium reproducing apparatus, which comprises circuit means for delaying a vertical synchronizing pulse of the video signal of the second system reproduced from the rotary recording medium, by a duration which is a real number multiple in the range of 25 times a horizontal scanning period, so as to generate the coincidence signal at a point when a number of horizontal synchronizing pulses equal to the preset value which has been set in the above counter means for the case where the rotary recording medium recorded with the video signal of the first signal is played are reproduced. According to the picture generating apparatus of the present invention, it is possible to generate the display data so that the "on screen display" in its entirety is constantly made at a most suitable position in the reproduced picture.

Other objects and further features of the present invention will be apparent from the following detailed description when read in conjunction with the accompanying drawings.

DETAILED DESCRIPTION

Figure 1:
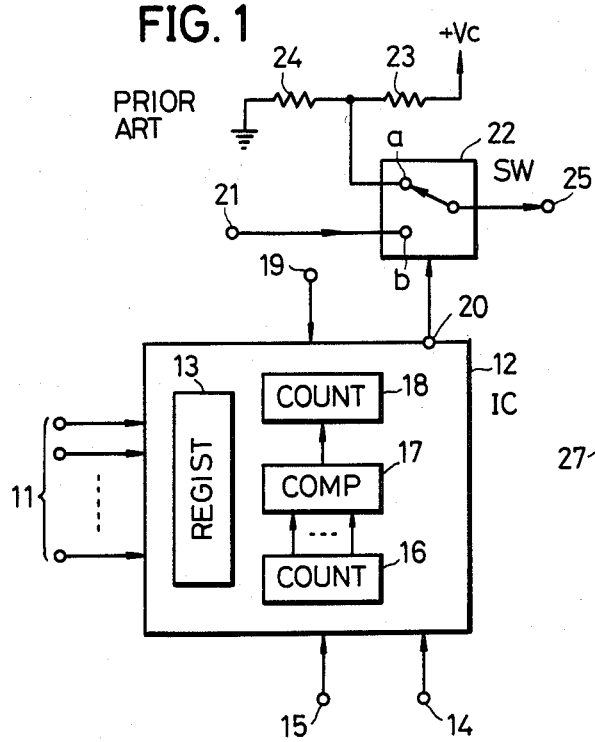
FIG. 1 is a systematic block diagram showing an example of a conventional picture generating apparatus.

First, description will be given with respect to a conventional picture generating apparatus, by referring to FIG. 1. An operator arbitrarily selects one kind of address signal from among various kinds of address signals within a signal which is reproduced from a video disc (not shown). The selected address signal is converted into a data which is to be displayed, and is supplied, through an input terminal 11, to a register 13 within an integrated circuit (IC) 12. The data which is supplied to the register 12 is stored therein. On the other hand, a vertical synchronizing pulse which is separated from a reproduced video signal, is supplied to the IC 12 through an input terminal 14. A horizontal synchronizing pulse which is separated from the reproduced video signal, is supplied to the IC 12 through an input terminal 15. A first counter 16 within the IC 12, starts to count the horizontal synchronizing pulses from a point when a trailing edge of the vertical synchronizing pulse is supplied to the IC 12. When a counted value in the counter 16 reaches a preset value which has been preset, a comparator 17 within the IC 12 produces a coincidence signal. This comparator 17 compares the counted value in the counter 16 and the preset value. The coincidence signal from the comparator 17, is supplied to a second counter 18 within the IC 12. The counter 18 starts to count clock pulses obtained through an input terminal 19, responsive to the coincidence signal from the comparator 17. The clock pulses may be generated within the IC 12.

The second counter 18 counts the clock pulses, and bits of the display data which is stored in the register 13 and is to be displayed on one horizontal scanning line, are produced serially through an output terminal 20 of the IC 12, within a preset predetermined range of counted values in the counter 18. The counter 18 counts the clock pulses with respect to the subsequent horizontal synchronizing pulse, and when the counted value is within the preset predetermined range of counted values, the bits of the display data which is stored in the register 13 and is to be displayed on the subsequent horizontal scanning line are produced serially through the output terminal 20. Thereafter, similar operations are repeated until a number of horizontal scanning pulses equal to a preset predetermined number, are supplied to the IC 12 through the input terminal 15.

The data obtained serially through the output terminal 20, is applied to a switching circuit 22 as a switching signal. For example, when the data assumes a low level, the switching circuit 22 is connected to a terminal b. In this state, the switching circuit 22 selectively passes a signal which is applied to an input terminal 21, and produces the signal through an output terminal 25. The signal which is applied to the input terminal 21, is a reproduced video signal which is obtained by demodulating the signal which is reproduced from the disc. On the other hand, when the data assumes a high level, the switching circuit 22 is connected to a terminal a. A D.C. voltage which is obtained by voltage-dividing a positive D.C. power source voltage +V by resistors 23 and 24, and corresponds to the white level, for example is applied to the terminal a of the switching circuit 22. Thus, when the data assumes a high level, the switching circuit 22 selectively passes the D.C. voltage which corresponds to the white level, and produces this D.C. voltage through the output terminal 25 as a picture which is to be displayed as an "on screen display".

Figure 2:
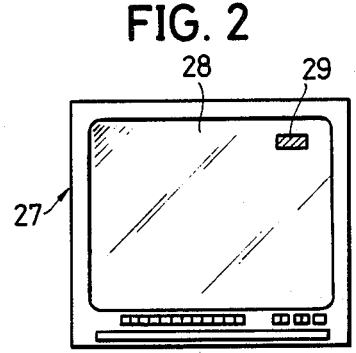
FIG. 2 shows an example of a display position of a picture of a small area to be generated.

Accordingly, the reproduced video signal and the reproduced audio signal from the video disc, are displayed and generated as sound in a television receiver 27 shown in FIG. 2. The picture related to the address information which has been arbitrarily selected by the operator, is displayed in white letters at a position 29, for example, within a reproduced picture 28 which is displayed on the television receiver 27. The picture which only covers a small area and is displayed in white letters, is displayed at the upper right corner of the reproduced picture 28 as indicated by the position 29 or at other corner parts of the reproduced picture 28, so as not to interfere with the display of the original picture which covers a large area. The display position 29 is determined by the preset value in the counter 16.

When playing a video disc which is recorded with a video signal of a second system and displaying a signal reproduced from this video disc on a monitoring television receiver of a first system, the previously proposed video disc reproducing apparatus changed the rotational speed of the disc according to the field frequency and the number of scanning lines in the video signal which is recorded on the video disc, as described in the introductory part of the present specification. In this case, the "on screen display" in the reproduced picture is made at a position which is higher than the position (the display position 29 in FIG. 2) of the "on screen display" which is made when playing a video disc which has been recorded with a video signal of the first system, due to the different number of horizontal scanning lines employed in the two systems. Therefore, there was a problem in that a portion of or the full "on screen display" could not be made within the reproduced picture.

Figure 3:
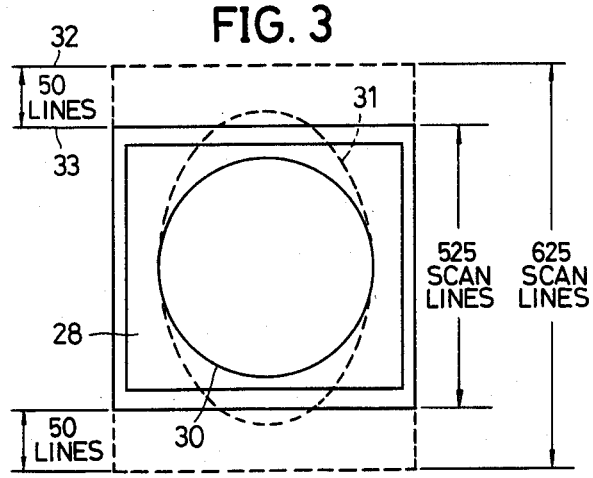
FIG. 3 is a diagram for explaining a reproduced picture which is obtained in a case where a video signal of a second system having a field frequency of 50 Hz and 625 scanning lines is displayed on a receiver which is designed to display a video signal of a first system having a field frequency of 59.94 Hz and 525 scanning lines, by converting the horizontal scanning frequency of the second system to a frequency equal to the horizontal scanning frequency of the first system.

In other words, the monitoring television receiver of the first system is designed to display the video signal of the first system having a field frequency of 60 Hz and 525 scanning lines, as the reproduced picture 28 as shown in FIG. 3. On the other hand, the video signal of the second system, which is reproduced from the video disc, has a field frequency of 50 Hz and 625 scanning lines which is 100 lines more than the video signal of the first system. Hence, when this video signal of the second system is displayed on a commonly available television receiver which is exclusively designed for the first system and does not have means for converting the vertical scanning frequency from 60 Hz to 50 Hz, the reproduced picture becomes stretched vertically with respect to the reproduced picture 28. That is, the reproduced picture obtained in this case is equivalent to making a display by adding 50 horizontal scanning lines at both the upper and lower parts of the reproduced picture 28 so as to display contains 625 scanning lines. For this reason, in a case where the video signal of the second system, which is recorded on the video disc, relates to a picture which should originally be displayed as a circular picture 30 indicated by a solid line in FIG. 3 on a television receiver of the second system, this video signal of the second system is displayed as a vertically stretched oval picture 31 indicated by phantom lines in FIG. 3 on the television receiver of the first system. As a result, upper and lower parts of the reproduced picture runs out of the reproduced picture 28.

In the conventional picture generating apparatus shown in FIG. 1, the counter 16 within the IC 12 determines the display position of the "on screen display" in the vertical direction of the picture. This counter 16 is designed to count the horizontal synchronizing pulses from the trailing edge of the vertical synchronizing pulse. Accordingly, compared to the case where the disc recorded with the video signal of the first system is played, the display position of the "on screen display" is moved to a display position which is higher by 50 scanning lines, that is, by 25 counts in the counter 16 if the interlacing was taken into account, when playing the disc recorded with the video signal of the second system and displaying the reproduced picture on the television receiver made exclusively for the first system. Consequently, a portion of or the full "on screen display" could not be made within the reproduced picture.

Figure 4:
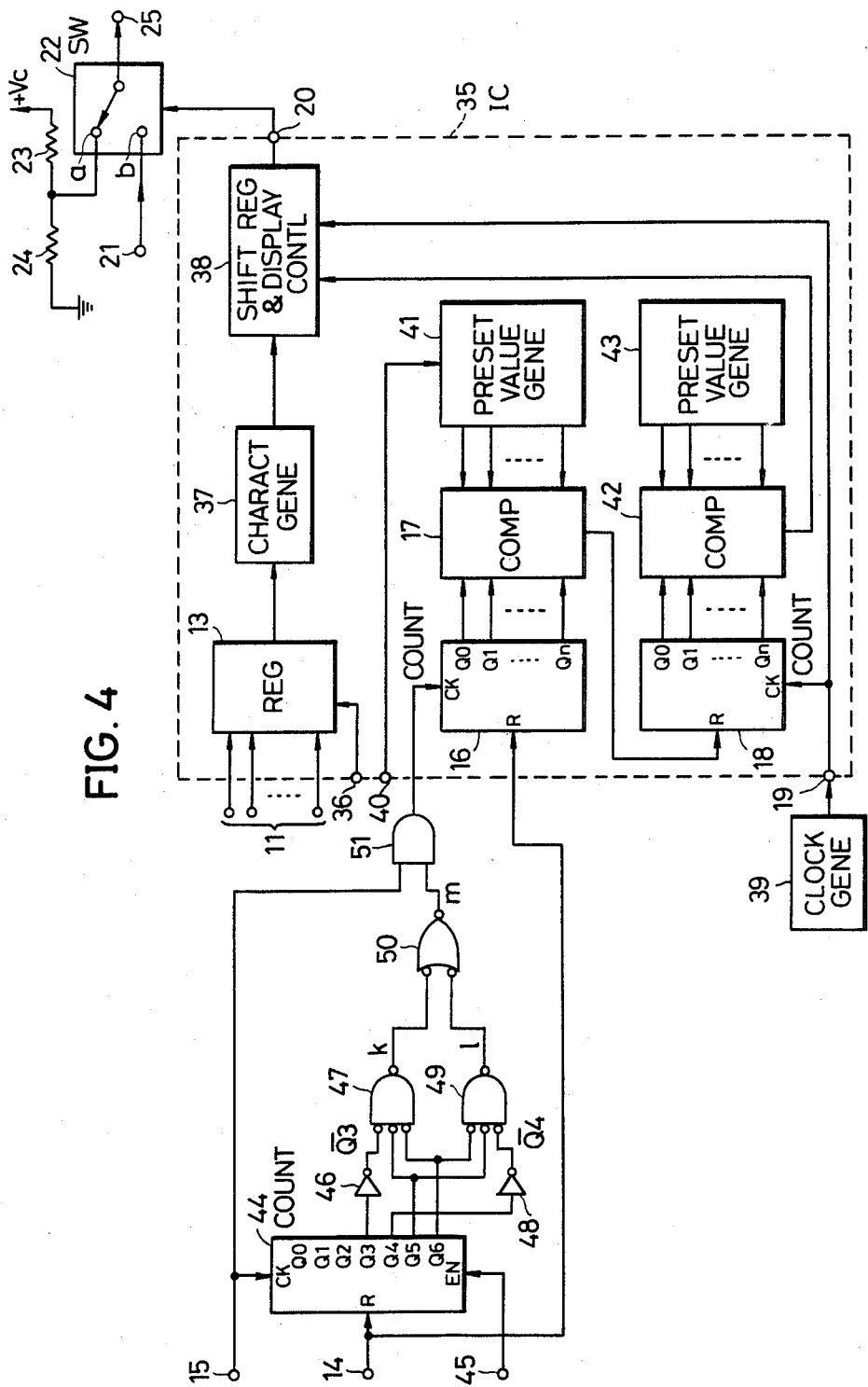
FIG. 4 is a systematic circuit diagram showing a first embodiment of a picture generating apparatus according to the present invention.

Next, description will be given with respect to a first embodiment of a picture generating apparatus according to the present invention, by referring to FIG. 4. In FIG. 4, those parts which are the same as those corresponding parts in FIG. 1 are designated by the same reference numerals, and their description is omitted. In FIG. 4, an IC 35 shows the IC 12 in more detail. A known IC such as a chip MN1217 manufactured by Matsushita Electronics Corporation of Japan, for example, may be used for the IC 35. The data which is to be displayed, is supplied to the register 13 within the IC 35, through the input terminal 11. The data supplied to the register 13, is loaded into the register 13 responsive to a load pulse from an input terminal 36. The loaded data is supplied to a character generator 37 from the register 13, and an output signal of the character generator 37 is supplied to a shift register and display control circuit 38. Clock pulses from a clock generator 39, are supplied to a clock input terminal CK of the counter 18 through the input terminal 19, and to the shift register and display control circuit 38. In the present embodiment, no signal is applied to a terminal 40 of the IC 35, and a preset value generating circuit 41 is fixed to generate a predetermined preset value.

On the other hand, the vertical synchronizing pulse from the input terminal 14, is applied to a reset terminal R of a 7-bit counter 44. A horizontal synchronizing pulse HS shown in FIG. 5(A), which is obtained from the input terminal 15, is applied to a clock input terminal CK of the counter 44. Further, a system selection signal from an input terminal 45, is applied to an enable terminal EN of the counter 44. The system selection signal assumes a high level when the disc which is to be played is recorded with the video signal of the second system having the field frequency of 50 Hz and 625 scanning lines, as in the case of PAL or SECAM system video signal. On the other hand, when the disc which is to be played is recorded with the video signal of the first system having the field frequency of 59.94 and 525 scanning lines as in the case of an NTSC system video signal, the system selection signal assumes a low level. The counter 44 is disabled when a low-level signal is applied to the enable terminal EN, and in this state, outputs at terminals $Q_0$ through $Q_6$ related to the seven bits assume a low level.

Description will now be given with respect to the method of forming the system selection signal. The picture generating apparatus according to the present invention is provided within the disc reproducing apparatus. The video signal which is reproduced from the video disc, is demodulated into a reproduced color video signal which is in conformance with a predetermined standard system, and this reproduced color video signal is applied to the input terminal 21. Among the address data which are obtained by demodulating a plurality of kinds of address signals which are reproduced from the video disc, one kind of address data which is selected by the operator is applied to the input terminal 11 as described before. The processing system for processing the signal which is reproduced from the video disc is known, and description of the processing system will be omitted in the present specification since the processing system is not directly related to the subject matter of the present invention.

In a case where the video disc is of the electrostatic capacitance type, the video disc is accommodated within a case in an unused state before the video disc is loaded into the disc reproducing apparatus. The case generally comprises a main case body and a lid (lid plate). The lid is detachably fitted into an opening in the main case body, so that a video disc accommodated within the main case body does not fall out of the main case body.

Figure 8:
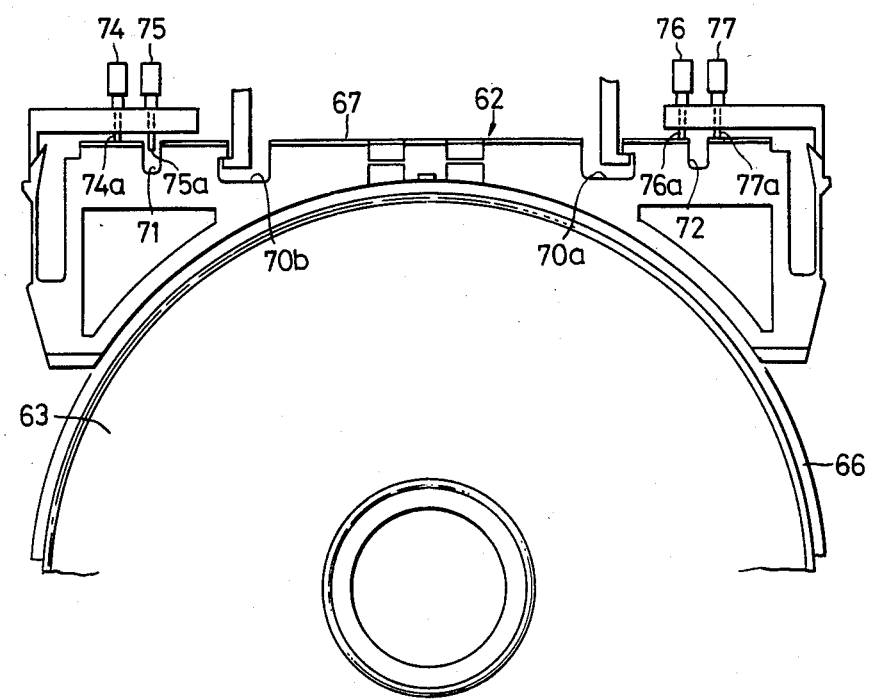
FIG. 8 shows an example where a lid of the case engages with microswitches within a reproducing apparatus.

As previously proposed in a U.S. Pat. No. 4,419,710 of which the assignee is the same as the assignee of the present application, as shown in FIG. 8, cutouts or non-cutout parts 71 and 72 for enabling the reproducing apparatus to discriminate information such as the playing side and recorded information content of the video disc 63, are formed at the front end of the lid 62 of the case in addition to cutouts 70a and 70b which are provided to enable the reproducing apparatus to lock the lid 62. The case 60 having the lid 62, the main case body, and a video disc 63 is inserted into the reproducing apparatus. When the inserted main case body 61 is thereafter extracted from the reproducing apparatus, the lid 62 is left within the reproducing apparatus together with the video disc 63 by a predetermined mechanism. The video disc 63 is then placed onto a turntable 66, as shown in FIG. 8. On the other hand, the lid 62 is held in a state opposing microswitches 74 through 77 which are located at an innermost part of the reproducing apparatus in the inserting direction of the case 60, as shown in FIG. 8.

Actuators 74a and 75a of the microswitches 74 and 75 are not pushed by the lid 62, due to the provision of the cutout 71. Thus, the microswitches 74 and 75 remain OFF. On the other hand, the cutout 72 does not oppose the microswitches 76 and 77. Hence, actuators 76a and 77a of the microswitches 76 and 77 are pushed by the rim part 67 of the lid 62, and the microswitches 76 and 77 are turned ON. Accordingly, in a case where it is decided beforehand that the recorded video signal is of the system employing 525 scanning lines when the microswitch 76 is turned ON and that the recorded video signal is of the system employing 625 scanning lines when the microswitch 76 is turned OFF, it is possible to automatically produce the system selection signal in response to the output of the microswitch 76, immediately before the video disc 63 is played.

The system of the video signal which is recorded on the video disc 63, may be indicated on a label which is adhered on the case. In this case, the operator can read the label and apply the appropriate system selection signal to the picture generating apparatus by manipulating a manual switch.

Returning now to the picture generating apparatus shown in FIG. 4, the output terminal $Q_3$ of the counter 44 is coupled to a first input terminal of a 3-input OR circuit 47, through an inverter 46. The output terminal $Q_4$ of the counter 44 is coupled to a first input terminal of a 3-input OR circuit 49, through an inverter 48. The output terminal $Q_5$ is coupled to respective second input terminals of the OR circuits 47 and 49, and the output terminal $Q_6$ is coupled to respective third input terminals of the OR circuits 47 and 49. Output terminals of the OR circuits 47 and 49 are coupled to a 2-input AND circuit 50, and an output terminal of the AND circuit 50 is coupled to one input terminal of a 2-input AND circuit 51. The counter 44, the inverters 46 and 48, the OR circuits 47 and 49, and the AND circuits 50 and 51 constitute a gate means.

It will now be assumed that the disc reproducing apparatus plays the video disc recorded with the video signal of the second system described before, and that the reproduced video signal is displayed as a reproduced picture on the monitoring television receiver which is originally designed to display the video signal of the first system. In this case, a high-level system selection signal is applied to the input terminal 45, and the counter 44 assumes a state where the counting operation can be started. In this state, when the reproduced vertical synchronizing pulse is applied to the reset terminal R of the counter 44 to reset the counter 44, the counter 44 starts to count the horizontal synchronizing pulses from the input terminal 15 which are reproduced in continuous with the vertical synchronizing pulse.

Figure 5:
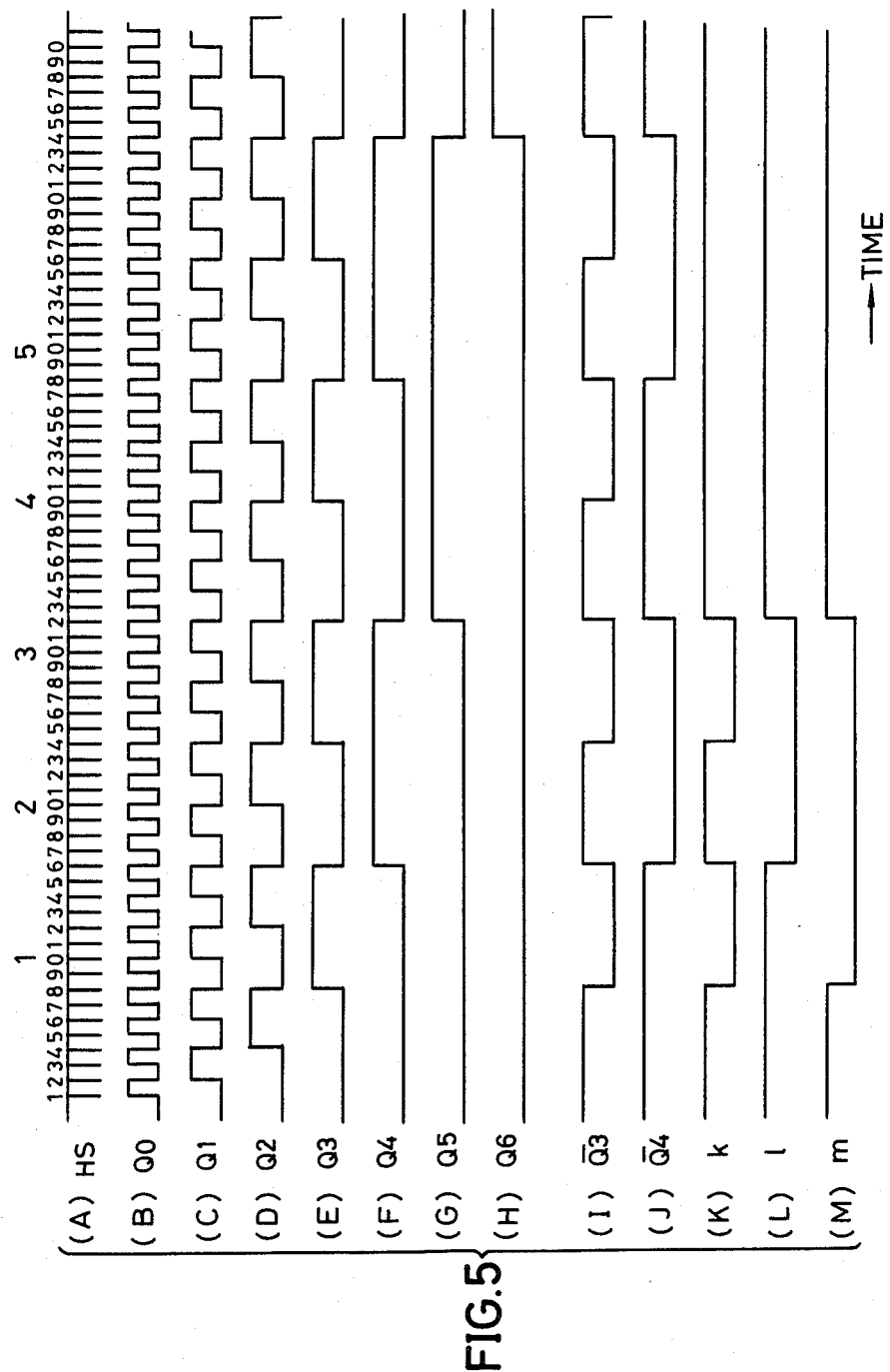
FIG. 5(A) through 5(M) show signal waveforms for explaining the operation of the circuit system shown in FIG. 4.

Accordingly, when it is assumed that the horizontal synchronizing pulse HS has the waveform shown in FIG. 5(A), pulses shown in FIGS. 5(B), 5(C), 5(D), 5(E), 5(F), 5(G), and 5(H) are respectively produced through the output terminals $Q_0$, $Q_1$, $Q_2$, $Q_3$, $Q_4$, $Q_5$, and $Q_6$ of the counter 44. The pulse from the output terminal $Q_3$, having a period which is 16 times the horizontal scanning period, is phase-inverted in the inverter 46, and is formed into a pulse $\overline{Q}_3$ shown in FIG. 5(I). On the other hand, the pulse from the output terminal $Q_4$, having a period which is 32 times the horizontal scanning period, is phase-inverted in the inverter 48, and is formed into a pulse $\overline{Q}_4$ shown in FIG. 5(J). Hence, the OR circuit 47 takes the logical sum of the pulses from the output terminals $Q_5$ and $Q_6$ and the pulse $\overline{Q}_3$, and produces a pulse k shown in FIG. 5(K). On the other hand, the OR circuit 49 takes the logical sum of the pulses from the output terminals $Q_5$ and $Q_6$ and the pulse $\overline{Q}_4$, and produces a pulse l shown in FIG. 5(L).

The AND circuit 50 takes the logical sum of the pulses k and l supplied thereto, and produces a pulse m shown in FIG. 5(M). As shown in FIG. 5(M), the pulse m assumes a low level during an interval between a point when the eighth horizontal synchronizing pulse is obtained and a point when the thirty-second horizontal synchronizing pulse is obtained, from a point immediately after the vertical synchronizing pulse. This pulse m is supplied to the AND circuit 51. The AND circuit 51 takes the logical multiplication between the pulse m and the horizontal synchronizing pulse from the input terminal 15, and supplies an output pulse to the counter 16 within the IC 35. Hence, the transmission of the horizontal synchronizing pulses to the counter 16 is blocked with respect to the ninth through thirty-second (or eighth through thirty-first) horizontal synchronizing pulses from a point immediately after the vertical synchronizing pulse. Accordingly, when playing the video disc recorded with the video signal of the second system, the counter 16 does not count 24 horizontal synchronizing pulses after the vertical synchronizing pulse is obtained. On the other hand, the preset value in the preset value generating circuit 41, constantly assumes a predetermined constant value. Accordingly, when the counted value in the counter 16 and the preset value in the preset value generating circuit 41 become equal, the comparator 17 generates a coincidence signal and resets the counter 18 by this coincidence signal, that is, starts the counting operation of the counter 18. As a result, compared to the case where the video disc recorded with the video signal of the first system is played, the comparator 17 causes the counter 18 to start counting the clock pulses at a point when 24 more horizontal synchronizing pulses have actually been reproduced and obtained at the input terminal 15 than the preset value in the preset value generating circuit 41.

The counter 18 starts to count the clock pulses from the clock generator 39 responsive to the coincidence signal from the preset value generating circuit 41, and supplies the counted value to a comparator 42. The comparator 42 compares the counted value from the counter 18 and a preset value from a preset value generating circuit 43. The preset value stored in the preset value generating circuit 43, determines the display position of the "on screen display" in the horizontal direction of the picture. The comparator 42 produces a coincidence signal when the counted value from the counter 18 and the preset value from the preset value generating circuit 43 coincide, and supplies this coincidence signal to the shift register and display control circuit 38. Accordingly, the shift register and display control circuit 38 repeats an operation in which a predetermined number of bits of data are produced serially for every incoming horizontal synchronizing pulse, based on the clock pulse from the clock generator 39, for a predetermined number of horizontal scanning lines.

When playing the disc recorded with the video signal of the first system, the counter 18 starts to count the clock pulses from a point when a horizontal synchronizing pulse located at a predetermined position in the picture is reproduced. In the case where the disc recorded with the video signal of the second system is played, the counter 18 starts to count the clock pulses from a point when a horizontal synchronizing pulse located at a position which is approximately the same as the above predetermined position in the picture is reproduced, due to the provision of the gate means described before. For this reason, even when the reproduced picture obtained by playing the disc recorded with the video signal of the second system is stretched vertically compared to the original picture, the "on screen display" of the display data related to the address information and the like is made at a display position which is approximately the same as the display position of the "on screen display" when the disc recorded with the video signal of the first system is played.

In FIG. 4, when playing the disc recorded with the video signal of the first system, the counter 44 is disabled as described before. Thus, this case, the output signals of the inverters 46 and 48 respectively assume a high level, and the output signal of the AND circuit 50 constantly assumes a high level. Therefore, the horizontal synchronizing pulse from the input terminal 15 is not blocked in the AND circuit 51. Accordingly, the counter 16 starts to count from the horizontal synchronizing pulse in the first scanning line of the first field as indicated by a line 33 in FIG. 3.

Figure 6:
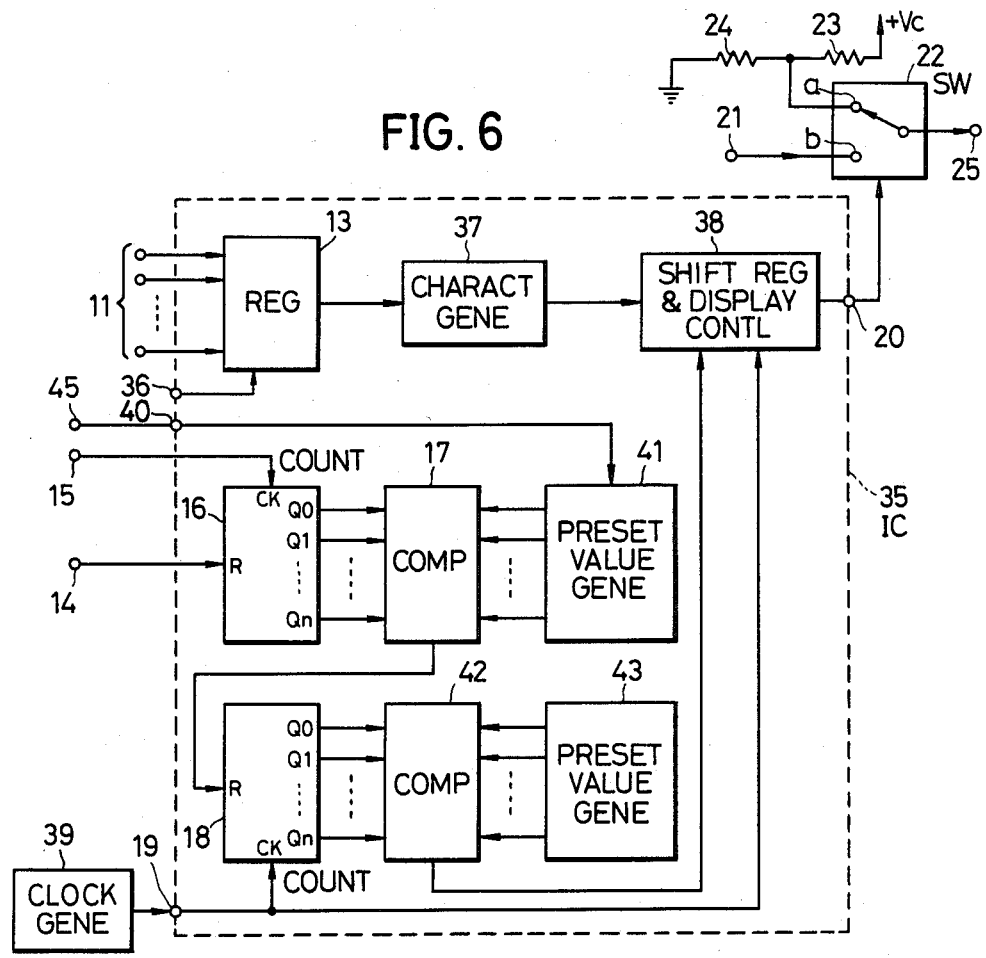
FIG. 6 is a systematic block diagram showing a second embodiment of a picture generating apparatus according to the present invention.

Next, description will be given with respect to a second embodiment of a picture generating apparatus according to the present invention, by referring to FIG. 6. In FIG. 6, those parts which are the same as those corresponding parts in FIG. 4 are designated by the same reference numerals. In FIG. 6, the system selection signal from the input terminal 45, is applied to the input terminal 40. The system selection signal is supplied to the preset value generating circuit 41 which determines the display position of the "on screen display" in the vertical direction of the picture. When playing the disc recorded with the video signal of the first system, the preset value in the preset value generating circuit 41 assumes a predetermined constant value $N_1$ which has been preselected. On the other hand, when playing the disc recorded with the video signal of the second system, the preset value $N_1$ is changed to a preset value $N_2$ responsive to the system selection signal. The preset value $N_2$ is larger than the preset value $N_1$ by 25 or by a value in the range of 25.

The counted value obtained by counting the horizontal synchronizing pulses in the counter 16, and the preset value $N_1$ or $N_2$ from the preset value generating circuit 41, are supplied to the comparator 17. The comparator 17 produces a coincidence signal when the two values supplied thereto coincide, and this coincidence signal resets the counter 18. Then, the counter 18 starts to count the clock pulses from the clock generator 39, and the counted value is supplied to the comparator 42. The preset value generating circuit 43 stores the a predetermined constant value which determines the display position of the "on screen display" in the horizontal direction of the picture.

According to this second embodiment, when playing the disc recorded with the video signal of the second system, the counter 16 starts to count the horizontal synchronizing pulse in a first scanning line 32 shown in FIG. 3 of the first field of the video signal of the second system. In this case, the preset value which is supplied to the comparator 17 from the preset value generating circuit 41, assumes the value $N_2$ which is larger than the value $N_1$ used when playing the disc recorded with the video signal of the first system, by 25 or by a value in the range of 25. As a result, the comparator 17 produces a coincidence signal at a point when $(N_2 - N_1)$ more horizontal synchronizing pulses have been counted in the counter 16 than the number $N_1$ which is counted when playing the disc recorded with the video signal of the first system. In other words, when playing the disc recorded with the video signal of the first system, the comparator 17 produces the coincidence signal at a point when a horizontal synchronizing pulse located at a predetermined position in the picture is reproduced, and in the case where the disc recorded with the video signal of the second system is played, the comparator 17 produces the coincidence signal at a point when a horizontal synchronizing pulse located at a position which is approximately the same as the above predetermined position in the picture is reproduced. For this reason, even when the reproduced picture obtained by playing the disc recorded with the video signal of the second system is stretched vertically compared to the original picture, the "on screen display" of the display data related to the address information and the like is made at a display position which is approximately the same as the display position of the "on screen display" when the disc recorded with the video signal of the first system is played, as in the case of the first embodiment described before.

Figure 7:
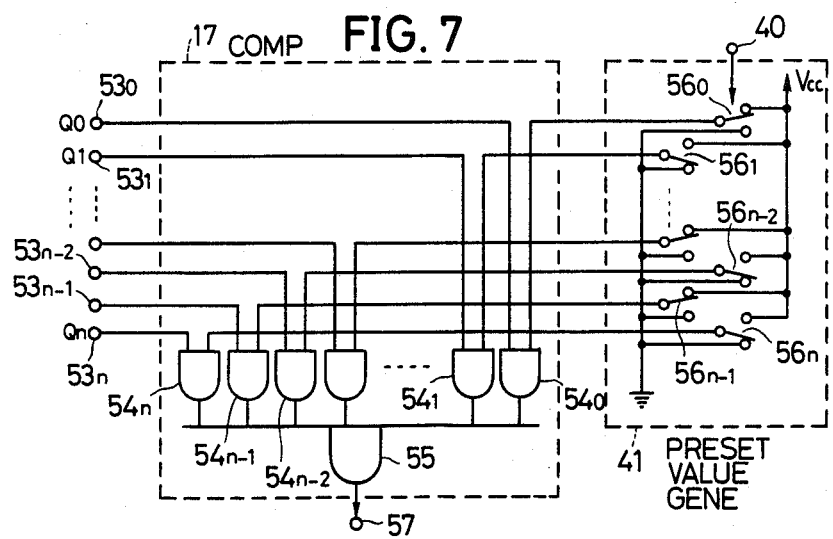
FIG. 7 is a circuit diagram showing an embodiment of an essential part of the block system shown in FIG. 6.

Next, description will be given with respect to the construction and operation of the comparators 17 and 42, and the preset value generating circuits 41 and 43. FIG. 7 shows a systematic circuit of the comparator 17 and the preset value generating circuit 41. The construction of the comparator 42 and the preset value generating circuit 43, is the same as the construction of the comparator 17 and the preset value generating circuit 41, and the illustration of the comparator 42 and the preset value generating circuit 43 is omitted in FIG. 7. In FIG. 7, the comparator 17 comprises 2-input AND circuits $54_0$, $54_1$, ..., $54_n$ and an (n+1)-input AND circuit 55. The signals from (n+1) output terminals $Q_0$, $Q_1$, ..., $Q_n$ of the counter 16, are supplied to respective first input terminals of the AND circuits $54_0$, $54_1$, ..., $54_n$, through input terminals $53_0$, $53_1$, ..., $53_n$. Output signals of the AND circuits $54_0$, $54_1$, ..., $54_n$ are commonly supplied to the AND circuit 55. The preset value generating circuit 41 comprises (n+1) switches $56_0$, $56_1$, ..., $56_n$. Common contacts of the switches $56_0$, $56_1$, ..., $56_n$ are coupled to respective second input terminals of the AND circuits $54_0$, $54_1$, ..., $54_n$. First of two switching contacts of the switches $56_0$, $56_1$, ..., $56_n$ are commonly coupled to a positive power source voltage Vcc. On the other hand, second of the two switching contacts of the switches $56_0, 56_1, \ldots, 56_n$ are commonly grounded. The switches $56_0, 56_1, \ldots, 56_n$ are switched in response to the signal from the input terminal 40.

When the (n+1)-bit value from the preset value generating circuit 41 and the (n+1)-bit value from the input terminals $53_0, 53_1, \ldots, 53_n$ coincide, a high-level coincidence signal is obtained from the AND circuit 55 and is produced through an output terminal 57. In the IC 35, the preset value generating circuits 41 and 43 are constituted by a programmable logic array (PLA) in most cases, together with the comparators 17 and 42.

The picture generating apparatus according to the present invention is not limited to the embodiments described heretofore. For example, the gate means in the first embodiment and the preset value changing means for changing the preset value in the second embodiment, may be used together. However, when playing the disc recorded with the video signal of the second system in this case, the preset value changing means must change the preset value to a value which is larger than the preset value used when playing the disc recorded with the video signal of the first system, by a number which is obtained by subtracting the number of horizontal synchronizing pulses blocked in the gate means from 25 or from a number in the range of 25.

Further, the vertical synchronizing pulse in the video signal of the second system which is reproduced from the disc, may be delayed by a real number multiple in the range of 25 times the period of the reproduced horizontal synchronizing pulse, so as to supply the delayed vertical synchronizing pulse to the IC 35. In this case, there is no need to change the preset value in the preset value generating circuit 41, and it is possible to generate the coincidence signal at a point when a number of horizontal synchronizing pulses, equal to the number of horizontal synchronizing pulses which are reproduced when playing the disc recorded with the video signal of the first system, is reproduced.

Moreover, in principle, it is possible to employ two or more methods at the same time, from among the method of delaying the vertical synchronizing pulse, the method of blocking the horizontal synchronizing pulse, and the method of changing the preset value.

Various modifications may be made for the preset value changing means, such as employing a down-counter and changing the preset value of the down-counter. Further, the counters 16, 18, and 44 may be counter means employing a microcomputer. The description heretofore has been given for a case where the color video signal reproduced from the disc is displayed on the television receiver which is in conformance with the NTSC system standards, however, the present invention can also be applied to a case where the reproduced signal is to be displayed on a black and white television receiver. Of course, the video signal recorded on the disc, may be a black and white video signal.

Besides the address information, the information which is to be displayed by the "on screen display" may be the system of the video signal which is recorded on the disc, or additional information which indicates whether the recorded audio signal is a stereo audio signal or a bilingual audio signal, for example. Moreover, the information which is to be displayed by the "on screen display" is not limited to the information which is reproduced from the disc. For example, when carrying out a random access, the target address which is manually selected by the operator, may be displayed by the "on screen display". In addition, it is not essential for the monitoring reproducing apparatus to be a television receiver, and the monitoring reproducing apparatus may be a display apparatus.

Further, the present invention is not limited to these embodiments, but various variations and modifications may be made without departing from the scope of the present invention.

What is claimed is:

1. A picture generating apparatus for a rotary recording medium reproducing apparatus, said reproducing apparatus having means for compatibly playing rotary recording mediums which are respectively recorded with video signals of different television systems, said reproducing apparatus reproducing one of said recorded video signals from a rotary recording medium by controlling the rotational speed of the rotary recording medium so that a horizontal synchronizing pulse in the recorded video signal is reproduced with a frequency which coincides with a horizontal scanning frequency of a video signal of a first system which employs 525 scanning lines, said picture generating apparatus comprising:

first input terminal means for receiving selected one of picture information data to be displayed on a specific part of a screen, said picture information data including a first address information, a second address information, and an additional information, said first address information being reproduced from the rotary recording medium and indicating an instant position of a recorded track being played, said second address information being designated manually and indicating a position of a recorded track on the rotary recording medium, said additional information indicating mode and type of signal recorded on the rotary recording medium;

second input terminal means for receiving horizontal synchronizing pulses which are reproduced subsequent to a vertical synchronizing pulse of the recorded video signal which is reproduced from the rotary recording medium;

storing means coupled to said first input terminal means for storing said picture information data from said first input terminal means, said data stored in said storing means being different from picture information data of said specific part being composed as a part of the recorded video signal;

counter means coupled to said second input terminal means for counting the horizontal synchronizing pulses from said input terminal means and for producing a coincidence signal when a counted value coincides with a preset value;

data obtaining means for successively obtaining said stored picture information data from said means for a predetermined number of scanning from a time when said coincidence signal is produced from said counter means;

signal selecting means switched and controlled in response to an output signal of said data obtaining means for selectively supplying to a monitoring reproducing apparatus a picture signal having a predetermined constant level in a duration in which said stored picture information data is obtained from said data obtaining means and the recorded video signal which is reproduced from said rotary recording medium in a duration in which said stored picture information data is not obtained from said data obtaining means; and control means for controlling by an output thereof said counter means so that said counter means produces said coincidence signal at a point when approximately 25 horizontal synchronizing pulses are reproduce more than a preset value of said counter means used when playing a rotary recording medium recorded with the video signal of the first system, only when the recorded video signal recorded on said rotary recording medium is of a second system employing 625 scanning lines.

2. A picture generating apparatus as claimed in claim 1 in which said control means comprises gate means for blocking a supply of approximately 25 horizontal synchronizing pulses to said counter means out of the horizontal sychronizing pulses reproduced subsequent to the vertical synchronizing pulse of the recorded video signal which is reproduced from said rotary recording medium when the recorded video signal is of the second system.

3. A picture generating apparatus as claimed in claim 1 in which said control means comprises preset value changing means for changing the value of said preset value of said counter means when playing said rotary recording medium recorded with the video signal of the first system to a value which is larger than said value by approximately 25 when playing said rotary recording medium which is recorded with the video signal of the second system.

4. A picture generating apparatus as claimed in claim 1 in which said control means comprises gate means for blocking a supply of a specific number of horizontal synchronizing pulses smaller than approximately 25 to said counter means out of the horizontal synchronizing pulses reproduced subsequent to the vertical synchronizing pulse of the recorded video signal which is reproduced from said rotary recording medium when said rotary recording medium is recorded with the video signal of the second system, and preset value changing means for changing the value of said preset value of said counter means when playing said rotary recording medium recorded with the video signal of the first system to a value which is larger than said value by the number which is obtained by subtracting said specific number from the approximately 25.

5. A picture generating apparatus as claimed in claim 4 in which said gate means comprises a counter, a logic circuit, and a gate circuit, said counter being supplied with said horizontal synchronizing pulses within the reproduced video signal to a clock input terminal thereof and being supplied with said vertical synchronizing pulse within the reproduced video signal to a reset input terminal thereof, said counter being controlled to perform a counting operation when said rotary recording medium being played is recorded with the video signal of the second system and to stop the counting operation when rotary recording medium is recorded with the video signal of the first system, said logic circuit generating a pulse of a predetermined logic value until a counted value in said counter reaches a predetermined value from a reset value of said counter, said gate circuit being supplied with the output pulse of said logic circuit and said horizontal synchronizing pulses, said gate circuit blocking said horizontal synchronizing pulses only in a duration in which there is an incoming pulse from said logic circuit and gating and supplying said horizontal synchronizing pulses to said counter means in a duration in which there is no incoming pulse from said logic circuit.

6. A picture generating apparatus as claimed in claim 4 in which said preset value changing means comprises system selection signal generating means for generating a system selection signal indicative of whether or not the video signal recorded on said rotary recording medium which is to be played is of the first or second system, and third input terminal means through which said system selection signal is supplied to a preset value generating circuit within said counter means.

7. A picture generating apparatus as claimed in claim 1 in which said control means comprises delay means for delaying the reproduced vertical sysnchronizing pulse by a real number multiple of approximately 25 times the horizontal scanning period and for supplying the delayed vertical synchronizing pulse to said counter means only when the video signal being reproduced from said rotary recording medium is the video signal of the second system.

* * * * *